United States Patent
Sun et al.

(10) Patent No.: US 12,406,349 B2
(45) Date of Patent: Sep. 2, 2025

(54) METHOD AND APPARATUS FOR DETECTING DEFECT ON SURFACE OF CELL

(71) Applicant: CONTEMPORARY AMPEREX TECHNOLOGY (HONG KONG) LIMITED, Hong Kong (CN)

(72) Inventors: Hongji Sun, Ningde (CN); Fei Chen, Ningde (CN); Guannan Jiang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 194 days.

(21) Appl. No.: 18/454,184

(22) Filed: Aug. 23, 2023

(65) Prior Publication Data

US 2024/0037726 A1 Feb. 1, 2024

Related U.S. Application Data (63) Continuation of application No. PCT/CN2023/085076, filed on Mar. 30, 2023.

(30) Foreign Application Priority Data

Jul. 29, 2022 (CN) .......................... 202210907837.9

(51) Int. Cl.
*G06T 7/00* (2017.01)
*G06T 7/11* (2017.01)

(52) U.S. Cl.
CPC ............. *G06T 7/0004* (2013.01); *G06T 7/11* (2017.01); *G06T 2207/10024* (2013.01); *G06T 2207/20084* (2013.01)

(58) Field of Classification Search
CPC ..................... G06T 7/0004; G06T 7/11; G06T 2207/10024; G06T 2207/20084; G06T 2207/10144; G06T 7/0012
See application file for complete search history.

(56) References Cited

U.S. PATENT DOCUMENTS 11,763,549 B1* 9/2023 Shu ...................... G06V 10/44
2021/0374940 A1 12/2021 Liu et al.
(Continued)

FOREIGN PATENT DOCUMENTS

CN 109472284 A 3/2019
CN 109598721 A 4/2019
(Continued)

OTHER PUBLICATIONS

Extended European Search Report dated Jul. 5, 2024 for application EP 23744030.0.
(Continued)

*Primary Examiner* — Bobbak Safaipour
(74) *Attorney, Agent, or Firm* — Ladas & Parry, LLP (57) ABSTRACT

A method and apparatus for detecting a defect on a surface of a cell, including: obtaining an initial image of the surface of the cell by using an image acquisition unit; preprocessing the initial image to obtain at least one image to be detected of the surface of the cell; and inputting the at least one image to be detected into a defect detection neural network model, and obtaining a detection result outputted by the defect detection neural network model, the detection result being used to indicate whether there is a defect on the surface of the cell is described. According to technical solutions, features of the defect in the image may be made prominent, so as to facilitate subsequent detection of the defect detection neural network model; and more features may be
(Continued)

extracted from the image, thereby improving the efficiency and accuracy of defect detection.

16 Claims, 8 Drawing Sheets

(56) References Cited

U.S. PATENT DOCUMENTS

| | | | |
|---|---|---|---|
| 2021/0390682 A1 | 12/2021 | Lin et al. | |
| 2024/0169510 A1* | 5/2024 | Gao | G06V 10/82 |

FOREIGN PATENT DOCUMENTS

| | | |
|---|---|---|
| CN | 111060514 A | 4/2020 |
| CN | 111598877 A | 8/2020 |
| CN | 111640091 A | 9/2020 |
| CN | 112241699 A | 1/2021 |
| CN | 112634254 A | 4/2021 |
| CN | 113092489 A | 7/2021 |
| CN | 114782310 A | 7/2022 |
| CN | 115829912 A | 3/2023 |
| KR | 101030449 B1 | 4/2011 |

OTHER PUBLICATIONS

Chen Gong et al: "Film Defects of Lithium Battery Recognition Based on Brightness and One-against-All Support Vector Machine", Applied Mechanics and Materials, vol. 462-463, Nov. 1, 2013 (Nov. 1, 2013), pp. 155-158.
ISR for International Application No. PCT/CN2023/085076 mailed Jun. 17, 2023.
Chinese OA1 issued for copending Application No. 202210907837.9 issued May 25, 2023.
Reexamination Decision from corresponding Chinese Patent Application No. 202210907837.9 dated Feb. 28, 2025, including English translation by Google Translate.
Zhao Jian, "News Photography Tutorial," Film and Television Media Book Series, p. 248, 1st Edition, Aug. 2013, Chongqing University Press, and synopsis in English.
Ma Lingyun and Sun Ying, "Chinese Photoshop CS3," pp. 327-328, 1st Edition, Jan. 2008, Shanghai Jiao Tong University Press, and synopsis in English.

* cited by examiner

FIG. 10

METHOD AND APPARATUS FOR DETECTING DEFECT ON SURFACE OF CELL

CROSS-REFERENCE TO RELATED APPLICATIONS

This application is a continuation of International Patent Application No. PCT/CN2023/085076, filed on Mar. 30, 2023 that claims priority to Chinese Patent Application No. 202210907837.9, filed on Jul. 29, 2022. The subject matter of these applications is incorporated herein by reference in its entirety.

TECHNICAL FIELD

The present application relates to the field of battery technologies and the field of machine vision detection technologies, and in particular, to a method and apparatus for detecting a defect on a surface of a cell, a method and apparatus for training a defect detection neural network model, an electronic device, a computer-readable storage medium, and a computer program product.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. For the electric vehicles, the battery technology is an important factor to their development.

In the related art, a rechargeable battery (also known as a secondary battery, is referred to as a battery that can continue to be used, through charging during which active substances are activated, after discharging) includes a battery case and a plurality of battery cells that are located in the battery case and combined in a manner of being connected in series and/or in parallel. A battery cell is the smallest unit of a battery that provides energy source. A cell is a key component of a battery cell where an electrochemical reaction occurs, and a main structure of the cell includes an anode plate, a cathode plate, and a separator that separates the anode plate from the cathode plate.

How to improve the production yield of cells is a technical problem to be solved urgently in the art.

SUMMARY OF THE INVENTION

The present application is intended to solve at least one of the technical problems existing in the prior art. For this purpose, an objective of the present application is to provide a method and apparatus for detecting a defect on a surface of a cell, a method and apparatus for training a defect detection neural network model, an electronic device, a computer-readable storage medium, and a computer program product, to improve the production yield of cells.

An embodiment in a first aspect of the present application provides a method for detecting a defect on a surface of a cell, including: obtaining an initial image of the surface of the cell by using an image acquisition unit; preprocessing the initial image to obtain at least one image to be detected of the surface of the cell; and inputting the at least one image to be detected into a defect detection neural network model, and obtaining a detection result outputted by the defect detection neural network model, the detection result being used to indicate whether there is a defect on the surface of the cell.

In the technical solution of this embodiment of the present application, the initial image is preprocessed, and the defect in the preprocessed initial image is detected by using the defect detection neural network model, so that features of the defect in the image may be made prominent, so as to facilitate subsequent detection of the defect detection neural network model; and more features may be extracted from the image, thereby improving the efficiency and accuracy of defect detection.

In some embodiments, the at least one image to be detected includes a plurality of images to be detected, and the initial image contains a cell surface area where the surface of the cell is located; and the preprocessing the initial image to obtain at least one image to be detected of the surface of the cell includes: extracting the cell surface area from the initial image; and segmenting the cell surface area to obtain the plurality of images to be detected. Because some defects on the surface of the cell are relatively small, for example, only account for a small proportion of the entire surface of the cell, the cell surface area is extracted and segmented to obtain the small-sized images to be detected, such that features of these defects are more prominent in the images to be detected, thereby improving the accuracy of defect detection.

In some embodiments, the initial image has a first exposure, and the extracting the cell surface area from the initial image includes: directly extracting the cell surface area from the initial image; and adjusting an exposure of the cell surface area to obtain a cell surface area having a second exposure, where the first exposure is higher than the second exposure. As described above, the cell surface area is extracted from the initial image having a higher exposure, and then the exposure of the cell surface area is adjusted, such that features of some defects may be more prominent in the image having a lower exposure, thereby improving the extraction accuracy of the cell surface area and the accuracy of subsequent defect detection.

In some embodiments, the first exposure is configured such that a pixel value range of the cell surface area in the initial image is different from a pixel value range of other areas in the initial image than the cell surface area. The above implementation makes it easy to distinguish the cell surface area from the other areas in the initial image having the first exposure, thereby facilitating the extraction of the cell surface area from the initial image having the first exposure.

In some embodiments, the extracting the cell surface area from the initial image further includes: extracting a cell surface area with a preset color channel from the cell surface area having the second exposure; and the segmenting the cell surface area to obtain the plurality of images to be detected includes: segmenting the cell surface area with the preset color channel to obtain the plurality of images to be detected. Because features of some defects on the surface of the cell are more prominent in the image with the preset color channel, the features of these defects may be made prominent in the extracted cell surface area with the preset color channel, thereby facilitating subsequent detection of the defect detection neural network model, and improving the accuracy of defect detection.

In some embodiments, the preset color channel is a G channel. Because there is usually a blue adhesive tape on the surface of the cell, it may be avoided that the blue adhesive tape is extracted together with the cell surface area with the G channel, thereby reducing an impact of the blue adhesive tape on the extraction of features of the defect. Therefore, this facilitates subsequent detection of the defect detection neural network model on the defect in the cell surface area, so as to further improve the accuracy of defect detection.

In some embodiments, the directly extracting the cell surface area from the initial image includes: extracting the cell surface area from the initial image based at least on the pixel value range of the cell surface area. Because the areas in the initial image have specific differences in pixel values, the above technical solution for extracting the cell surface area based on the pixel values of the areas in the initial image may quickly and effectively extract the cell surface area.

In some embodiments, the plurality of images to be detected have equal sizes. As described above, the cell surface area is segmented into the plurality of images to be detected having same sizes, so that a requirement on a size of an input image of the defect detection neural network model is met, and the detection of the defect detection neural network model is facilitated.

In some embodiments, the detection result includes a corresponding defect confidence level of each of the images to be detected, and the inputting the at least one image to be detected into a defect detection neural network model, and obtaining a detection result outputted by the defect detection neural network model includes: inputting the at least one image to be detected into the defect detection neural network model, to obtain a defect confidence level of each of the at least one image to be detected; and determining, based on the defect confidence level of each of the at least one image to be detected, whether there is a defect on the surface of the cell. The defect detection neural network model may extract more features from the image, thereby improving the efficiency and accuracy of defect detection.

In some embodiments, the determining, based on the defect confidence level of each of the at least one image to be detected, whether there is a defect on the surface of the cell includes: determining whether the defect confidence level of each of the at least one image to be detected is less than or equal to a defect threshold; and in response to determining that the defect confidence levels of one or more of the at least one image to be detected are greater than the defect threshold, determining that there is a defect on the surface of the cell. As described above, whether there is a defect on the surface of the cell is determined based on the defect confidence level outputted by the defect detection neural network model and the preset defect threshold, so that the efficiency and accuracy of defect detection may be improved.

In some embodiments, the defect is an indentation defect. The indentation defect is detected by using the above method, so that the detection efficiency and accuracy of the indentation defect may be improved.

An embodiment in a second aspect of the present application provides a method for training a defect detection neural network model, including: obtaining a sample image of a surface of a cell, the sample image containing a preset defect on the surface of the cell; preprocessing the sample image to obtain at least one sample image to be detected of the surface of the cell; inputting the at least one sample image to be detected into a defect detection neural network model, and obtaining a detection result outputted by the defect detection neural network model, the detection result being used to indicate whether there is a defect on the surface of the cell; and adjusting a parameter of the defect detection neural network model based on the detection result and the preset defect.

According to the above embodiment of the present application, features of the defect in the image may be made prominent, so as to facilitate subsequent detection of the defect detection neural network model, and the efficiency and accuracy of the defect detection neural network model may also be improved.

In some embodiments, the at least one sample image to be detected includes a plurality of sample images to be detected, and the sample image contains a cell surface area where the surface of the cell is located; and the preprocessing the sample image to obtain at least one sample image to be detected of the surface of the cell includes: extracting the cell surface area from the sample image; and segmenting the cell surface area to obtain the plurality of sample images to be detected. Because some defects on the surface of the cell are relatively small, for example, only account for a small proportion of the entire surface of the cell, the cell surface area is extracted and segmented to obtain the small-sized images to be detected, such that features of these defects are more prominent in the images to be detected, thereby improving the training efficiency and accuracy of the defect detection neural network model.

In some embodiments, the sample image has a first exposure, and the extracting the cell surface area from the sample image includes: directly extracting the cell surface area from the sample image; and adjusting an exposure of the cell surface area to obtain a cell surface area having a second exposure, where the first exposure is higher than the second exposure. As described above, the cell surface area is extracted from the initial image having a higher exposure, and then the exposure of the cell surface area is adjusted, such that features of some defects may be more prominent in the image having a lower exposure, thereby improving the training efficiency and accuracy of the defect detection neural network model.

In some embodiments, the extracting the cell surface area from the sample image further includes: extracting a cell surface area with a preset color channel from the cell surface area having the second exposure; and the segmenting the cell surface area to obtain the plurality of sample images to be detected includes: segmenting the cell surface area with the preset color channel to obtain the plurality of sample images to be detected. Because features of some defects on some surfaces of the cell are more prominent in the image with the preset color channel, the features of these defects may be made prominent in the extracted cell surface area with the preset color channel, thereby facilitating subsequent detection of the defect detection neural network model, and improving the training efficiency and accuracy of the defect detection neural network model.

An embodiment in a third aspect of the present application provides an apparatus for detecting an indentation defect on a surface of a cell, including: an obtaining unit configured to obtain an initial image of the surface of the cell by using an image acquisition unit; a preprocessing unit configured to preprocess the initial image to obtain at least one image to be detected of the surface of the cell; and a detection unit configured to input the at least one image to be detected into a defect detection neural network model, and obtain a detection result outputted by the defect detection neural network model, the detection result being used to indicate whether there is a defect on the surface of the cell. The solution of this embodiment may obtain same technical effects as the corresponding method described above.

An embodiment in a fourth aspect of the present application provides an apparatus for training a defect detection neural network model, including: an image obtaining unit configured to obtain a sample image of a surface of a cell, the sample image containing a preset defect on the surface of the cell; an image processing unit, where a preprocessing module is configured to preprocess the sample image to obtain at least one sample image to be detected of the surface of the cell; a defect detection unit configured to input the at least one sample image to be detected into the defect detection neural network model, and obtain a detection result outputted by the defect detection neural network model, the detection result being used to indicate whether there is a defect on the surface of the cell; and an adjustment unit configured to adjust a parameter of the defect detection neural network model based on the detection result and the preset defect. The solution of this embodiment may obtain same technical effects as the corresponding method described above.

An embodiment in a fifth aspect of the present application provides an electronic device, including: at least one processor and a memory communicatively connected to the at least one processor, where the memory stores instructions executable by the at least one processor, and the instructions, when executed by the at least one processor, cause the at least one processor to perform a method for detecting a defect on a surface of a cell according to the present application and/or a method for training a defect detection neural network model according to the present application.

An embodiment in a sixth aspect of the present application provides a computer-readable storage medium storing computer instructions, where the computer instructions are used to cause a computer to perform a method for detecting a defect on a surface of a cell according to the present application and/or a method for training a defect detection neural network model according to the present application.

An embodiment in a seventh aspect of the present application provides a computer program product, including a computer program, where the computer program, when executed by a processor, implements a method for detecting a defect on a surface of a cell according to the present application and/or a method for training a defect detection neural network model according to the present application.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

In the accompanying drawings, the same reference numerals denote the same or similar parts or elements throughout a plurality of drawings unless otherwise specified. These drawings are not necessarily drawn to scale. It should be understood that these drawings depict only some embodiments according to the present application herein and are not to be construed as limiting the scope of the application.

LIST OF REFERENCE SIGNS

1000: vehicle;
100: battery; 200: controller; 300: motor;
10: case; 11: first portion; 12: second portion;
20: battery cell; 21: end cap; 22: housing; 23: cell assembly;
500: initial image; 510: cell surface area; 511: defect; 530: clamp area; 520: background area; 510a: cell surface area having a second exposure; 510b: cell surface area with a preset color channel; 512 and p1 . . . pn: images to be detected; t1 . . . tn: detection results; and 611: indentation defect.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

However, various defects may occur on batteries in various process stages of the production process of the batteries. For example, to ensure the flatness of a positive electrode plate, a separator, and a negative electrode plate relative to each other in a cell such that a thickness and a height of the cell meet specific requirements, there is a need to perform hot pressing on the cell. At this time, if a surface of the cell is unevenly stressed, an indentation defect may occur on the surface of the cell, which will not only affect the appearance of the cell, but also cause quality problems of the cell, such as poor self-discharge performance of the cell.

In the related art, during detection of an indentation defect on a surface of a product, a plurality of light sources and a plurality of cameras are usually used such that an image of the surface of the product to be detected is acquired under a light source with a specific wavelength range based on a spectral reflection characteristic of the product to be detected, and then a surface area is extracted from the acquired image and inputted into a conventional machine learning model (for example, a support vector machine (SVM)), so as to obtain a detection result outputted by the machine learning model, or a plurality of images captured under conditions of light sources from different angles are acquired, the plurality of images are fused, and defect recognition is performed on the fused image.

The applicant of the present application notes in conventional machine learning technologies that features extracted from an image are limited, and the detection accuracy greatly depends on imaging quality of an image acquisition unit, for example, both a light source used during image acquisition and the stability of a lens may affect a detection result. In addition, an image fusion method will affect prominence of some defects (such as an indentation defect), thereby affecting recognizability of defect features, and also increasing an image acquisition time and reducing a speed of an algorithm. It can be seen that the detection efficiency and detection accuracy of a defect detection method in the related art are low, which easily leads to excessive detection or missed detection of products, thereby easily bringing adverse effects on the industry. How to improve the production yield of cells has become a technical problem to be solved urgently in this field.

In view of the above technical problems that are found, the applicant provides, through in-depth research, a method and apparatus for detecting a defect on a surface of a cell, a method and apparatus for training a defect detection neural network model, an electronic device, a computer-readable storage medium, and a computer program product, so as to quickly and accurately detect the defect on the surface of the cell, so that the production yield of cells may be improved.

The solutions of the embodiments of the present application are applied in various production processes of cells, for example, implemented after the hot pressing stage of the cells. The solutions of the embodiments of the present application utilize computer vision technologies and deep learning technologies. An initial image of a surface of a cell is first obtained by using an image acquisition unit; then the initial image is preprocessed to obtain at least one image to be detected of the surface of the cell; and finally, the at least one image to be detected is inputted into a defect detection neural network model, and a detection result outputted by the defect detection neural network model is obtained. Compared to the related art, according to the solutions of the embodiments of the present application, features of the defect in the image may be made prominent, so as to facilitate subsequent detection of the defect detection neural network model; and more features may be extracted from the image, thereby improving the efficiency and accuracy of defect detection.

The solutions of the embodiments of the present application are applied in various production processes of cell assemblies of various traction batteries or energy storage batteries, for example, after the hot pressing process.

For ease of description of the following embodiments, an embodiment of the present application in which the power consuming device is a vehicle 1000 is taken as an example for description.

Figure 1:
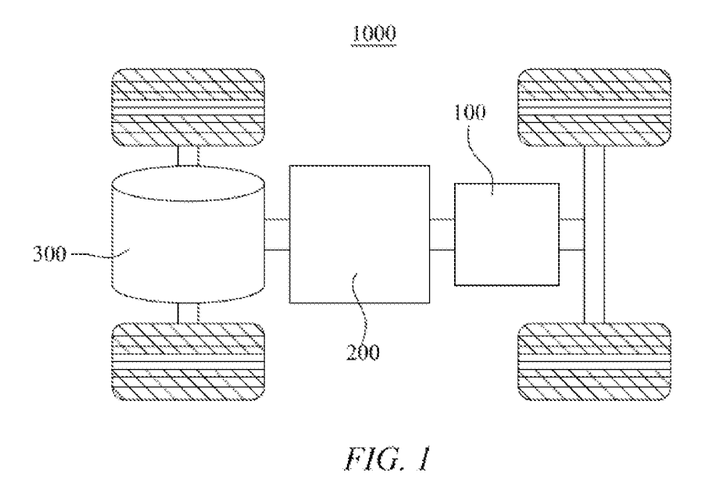
FIG. 1 is a schematic diagram of a structure of a vehicle according to some embodiments of the present application.

FIG. 1 is a schematic diagram of a structure of a vehicle 1000 according to some embodiments of the present application. The vehicle 1000 may be a fuel vehicle, a gas vehicle, or a new energy vehicle. The new energy vehicle may be a battery electric vehicle, a hybrid electric vehicle, an extended-range vehicle, etc. A battery 100 is provided inside the vehicle 1000, and the battery 100 may be arranged at the bottom, the front part, or the rear part of the vehicle 1000. The battery 100 may be configured to supply power to the vehicle 1000. For example, the battery 100 may be used as a power supply for operating the vehicle 1000. The vehicle 1000 may further include a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 can not only serve as a power supply for operating the vehicle 1000, but also serve as a power supply for driving the vehicle 1000, instead of or partially instead of fuel or natural gas, to provide driving power for the vehicle 1000.

Figure 2:
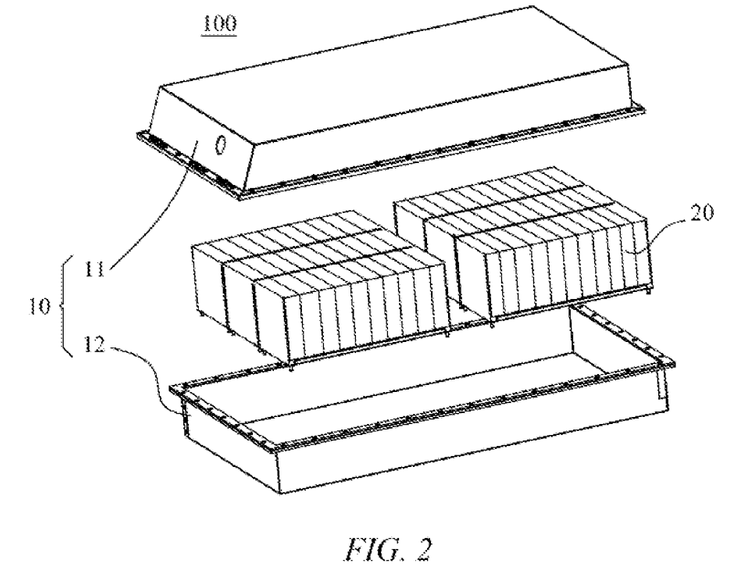
FIG. 2 is a schematic exploded diagram of a structure of a battery according to some embodiments of the present application.

FIG. 2 is an exploded diagram of the battery 100 according to some embodiments of the present application. The battery 100 includes a case 10 and battery cells 20. The battery cells 20 are accommodated in the case 10. The case 10 is configured to provide an accommodation space for the battery cells 20. In some embodiments, the case 10 may include a first portion 11 and a second portion 12. The first portion 11 and the second portion 12 cover each other, and the first portion 11 and the second portion 12 jointly define the accommodation space for accommodating the battery cells 20. The battery cell 20 may be a secondary battery or a primary battery; and may alternatively be a lithium-sulfur battery, a sodium-ion battery, or a magnesium-ion battery, but is not limited thereto. The battery cell 20 may be in the form of a cylinder, a flat body, a cuboid, etc.

Figure 3:
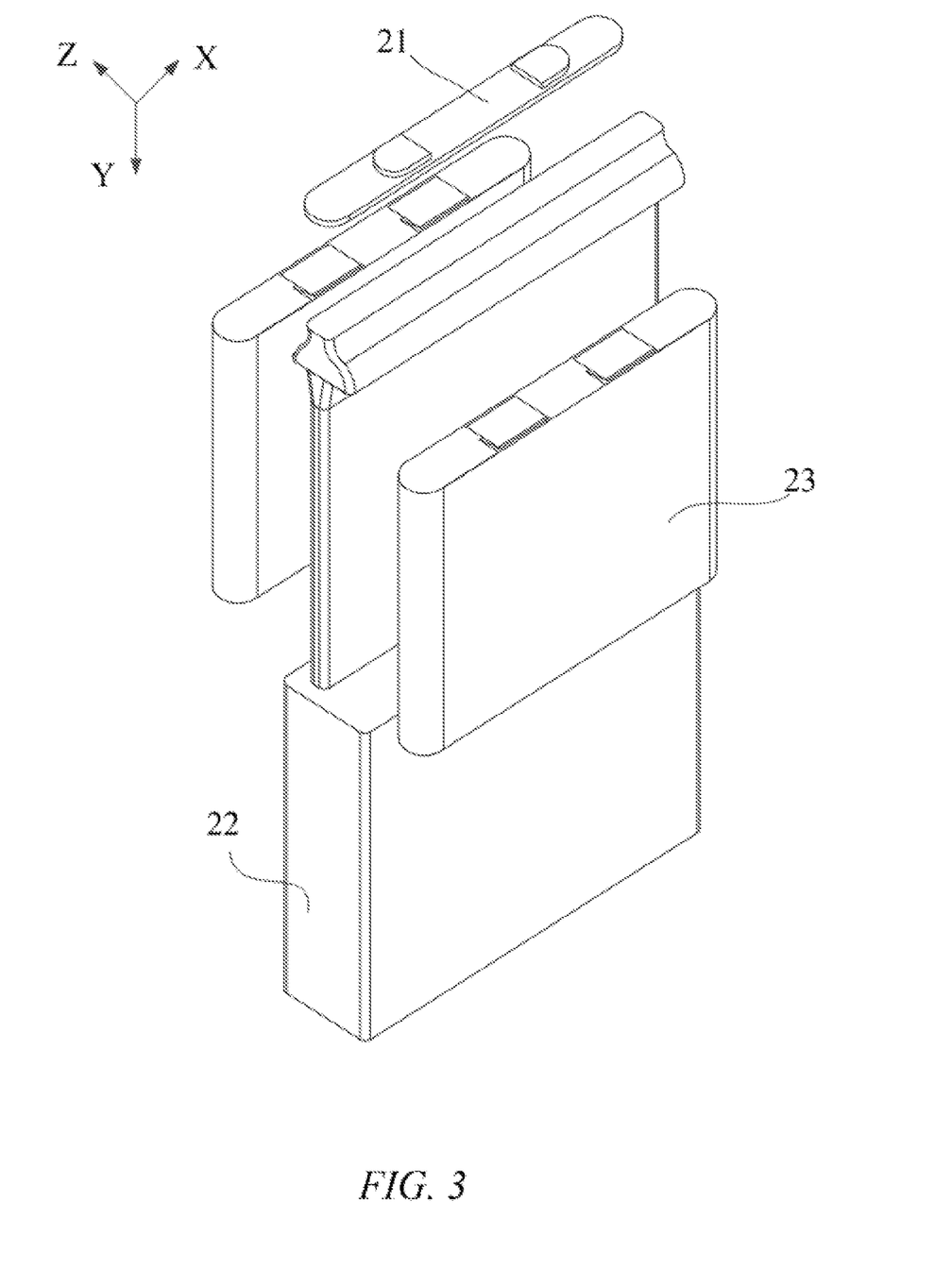
FIG. 3 is a schematic exploded diagram of a structure of a battery cell according to some embodiments of the present application.

FIG. 3 is a schematic exploded diagram of a structure of the battery cell 20 according to some embodiments of the present application. The battery cell 20 is the smallest unit of the battery. As shown in FIG. 3, the battery cell 20 includes an end cap 21, a housing 22, a cell assembly 23 (hereinafter also referred to as a cell), and other functional components.

The end cap 21 refers to a component that covers an opening of the housing 22 to isolate the internal environment of the battery cell 20 from the external environment. Without limitation, the end cap 21 may be shaped to adapt to the shape of the housing 22 so as to fit with the housing 22.

The housing 22 is an assembly configured to cooperate with the end cap 21 to form the internal environment of the battery cell 20, where the formed internal environment may be used to accommodate the cell assembly 23, an electrolyte, and other components.

The cell assembly 23 is a component in the battery cell 100 where an electrochemical reaction occurs. One or more cell assemblies 23 may be contained in the housing 22. The cell assembly 23 is mainly formed by winding or stacking the positive electrode plate and the negative electrode plate, and a separator is generally provided between the positive electrode plate and the negative electrode plate.

Figure 4:
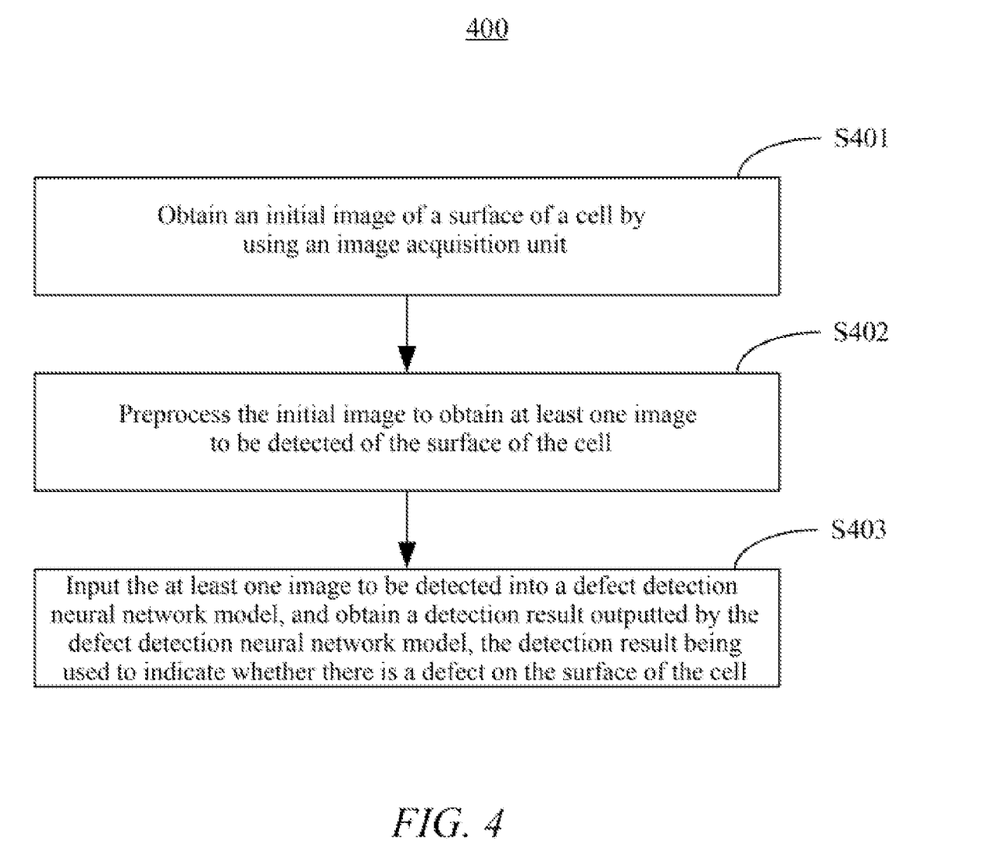
FIG. 4 is a schematic flowchart of a method for detecting a defect on a surface of a cell according to some embodiments of the present application.
Figure 5:
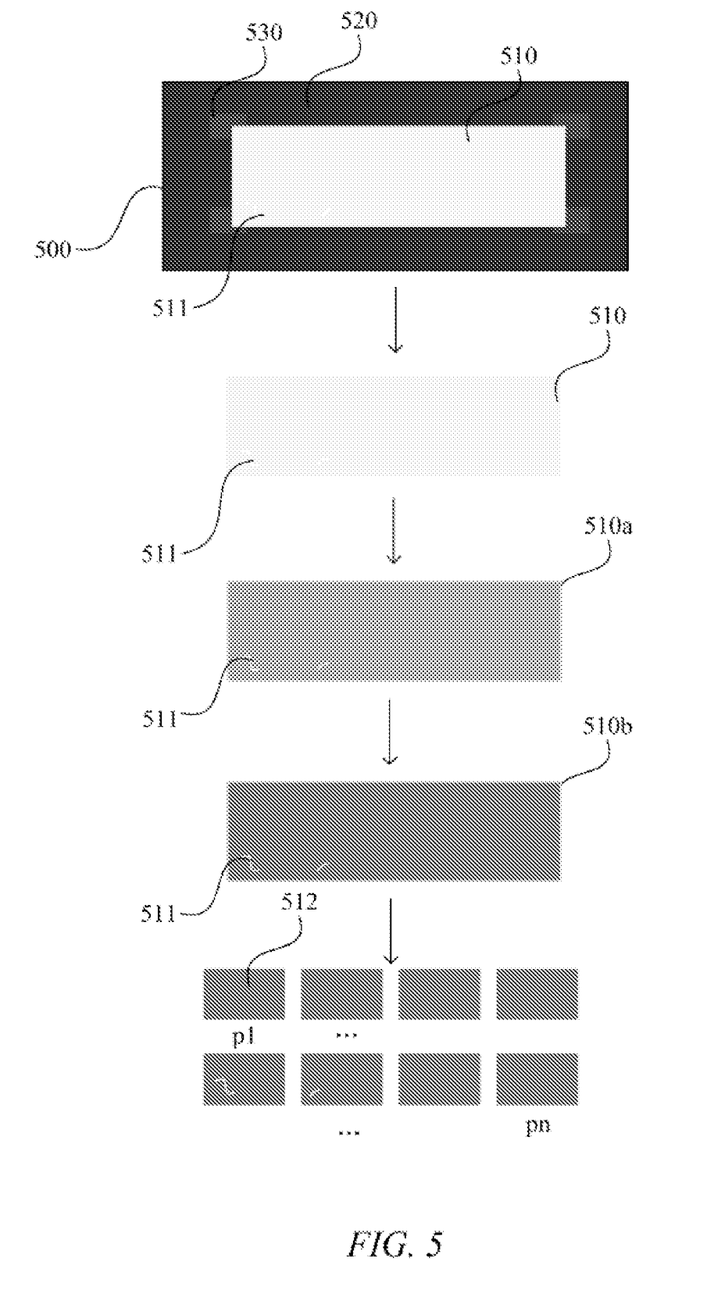
FIG. 5 is a schematic flowchart of preprocessing of an initial image according to some embodiments of the present application.
Figure 6:
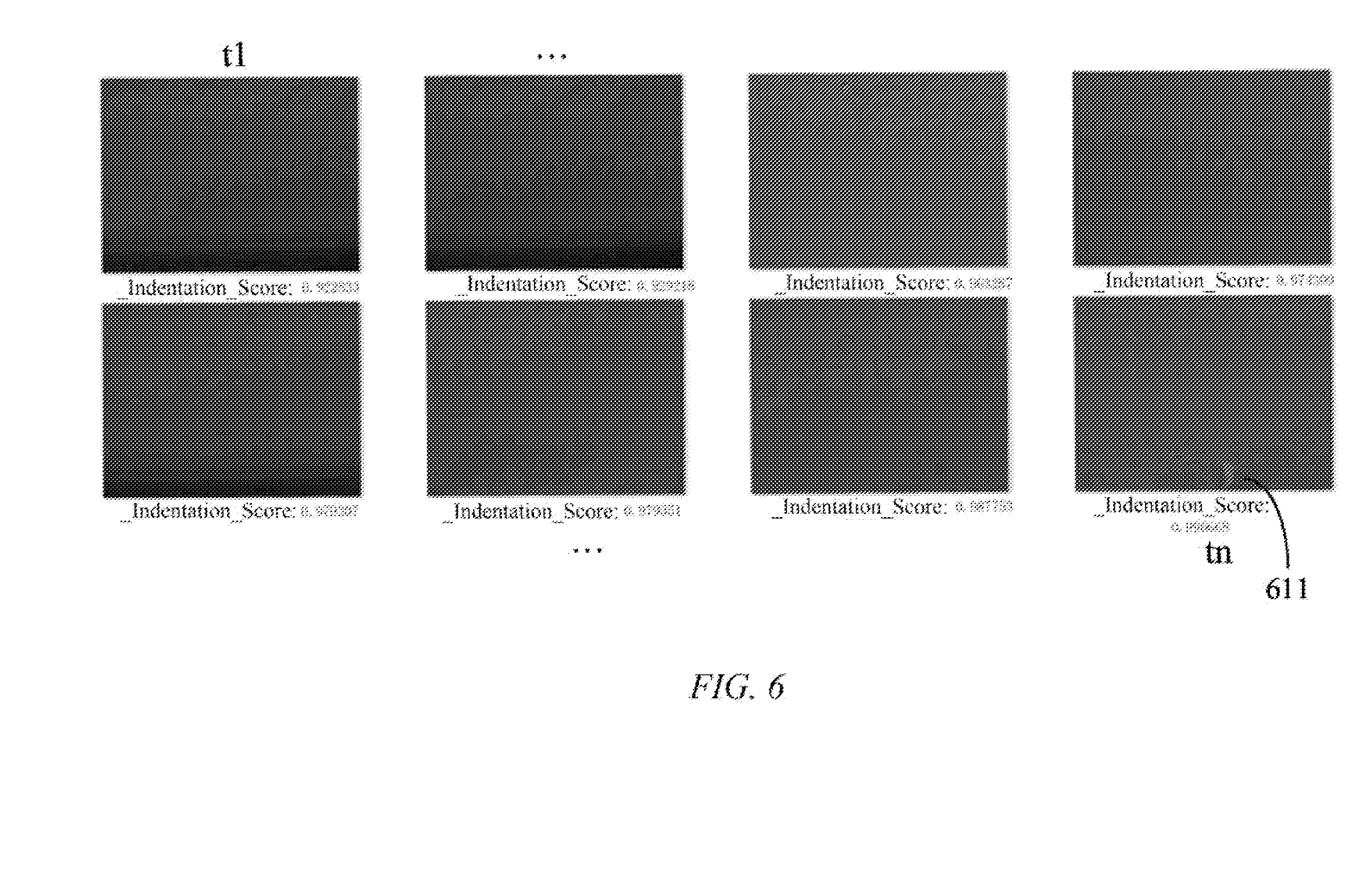
FIG. 6 is a schematic diagram of a detection result of each of a plurality of images to be detected according to some embodiments of the present application.

FIG. 4 is a schematic flowchart of a method 400 for detecting a defect on a surface of a cell according to some embodiments of the present application. FIG. 5 is a schematic flowchart of preprocessing of an initial image according to some embodiments of the present application. FIG. 6 is a schematic diagram of a detection result of each of a plurality of images to be detected according to some embodiments of the present application. The method 400 is described in detail below with reference to FIG. 4 to FIG. 6.

As shown in FIG. 4, the method 400 for detecting a defect on a surface of a cell (for example, the cell assembly 23 shown in FIG. 3) according to some embodiments of the present application may include the following steps S401 to S403.

In step S401, an initial image 500 of the surface of the cell is obtained by using an image acquisition unit (not shown).

In step S402, the initial image 500 is preprocessed to obtain at least one image 512 to be detected of the surface of the cell.

In step S403, the at least one image 512 to be detected is inputted into a defect detection neural network model, and a detection result outputted by the defect detection neural network model is obtained, the detection result being used to indicate whether there is a defect 511 on the surface of the cell.

A specific type of the image acquisition unit is not limited. For example, the image acquisition unit may be a CCD industrial camera, a CMOS industrial camera, etc. For another example, the image acquisition unit may be a line-scan camera, an area-array camera, etc.

As shown in FIG. 5, the obtained initial image 500 includes at least a cell surface area 510. In addition, the initial image 500 may further include a clamp area 530 for fixing the cell, and a background area 520 other than the cell surface area 510 and the clamp area 530. The defect 511 on the surface of the cell may be, for example, an indentation defect, a scratch defect, a bump defect, etc., and is not limited thereto in the present application.

The at least one image 512 to be detected that is obtained after the preprocessing in step S402 may include one or more images to be detected. Specifically, for example, when the defect on the surface of the cell accounts for a relatively large proportion, only preprocessing operations such as exposure adjustment and color channel extraction may be performed on the initial image 500 without segmentation. For another example, when the defect (for example, an indentation defect) on the surface of the cell accounts for a relatively small proportion, to increase the proportion of the defect such that features of the defect are more prominent, the initial image 500 may be segmented to obtain a plurality of images p1 . . . pn to be detected. Herein, the features of the defect in the image may include grayscale value, color, shape, contour, texture, etc.

The defect detection neural network model may be a deep learning model, for example, ResNet18, a DNN, etc. A deep learning model may extract a plurality of features such as grayscale value, color, shape, contour, and texture from an image, so as to improve the accuracy of defect detection. The detection result outputted by the defect detection neural network model may include a corresponding defect confidence level of each image to be detected.

The method 400 may be performed at a server or a client device. The server may include one or more general-purpose computers, a dedicated server computer (e.g., a personal computer (PC) server, a UNIX server, or a terminal server), a blade server, a mainframe computer, a server cluster, or any other suitable arrangement and/or combination. In some implementations, the server may be a server in a distributed system, a server combined with a blockchain, a cloud server, an intelligent cloud computing server or intelligent cloud host with artificial intelligence technologies, etc. The client device may include various types of computer devices, such as a portable handheld device, a general-purpose computer (such as a personal computer and a laptop computer), and a workstation computer. Alternatively, the method 400 may be performed at an industrial control computer equipped with a chip in the production line of cells. The chip may be a system on a chip (SoC) or the like.

In the method 400 in this embodiment of the present application, the initial image 500 is preprocessed, and the defect 511 in the preprocessed initial image 500 is detected by using the defect detection neural network model, so that features of the defect in the image may be made prominent, so as to facilitate subsequent detection of the defect detection neural network model; and more features may be extracted from the image, thereby improving the efficiency and accuracy of defect detection.

According to some embodiments of the present application, the at least one image 512 to be detected includes a plurality of images p1 . . . pn to be detected, and the initial image 500 contains a cell surface area 510 where the surface of the cell is located. The preprocessing the initial image 500 to obtain at least one image 512 to be detected of the surface of the cell in step S402 may include: extracting the cell surface area 510 from the initial image 500; and segmenting the cell surface area 510 to obtain the plurality of images 512 to be detected.

In other words, as shown in FIG. 5, the cell surface area 510 is first extracted from the initial image 500, and then the extracted cell surface area 510 is segmented to obtain the plurality of images p1 . . . pn to be detected. In some examples, the plurality of segmented images to be detected may have same sizes (as shown in FIG. 5), or may have different sizes, or some of the images may have same sizes and the other may have different sizes.

Because some defects on the surface of the cell are relatively small, for example, only account for a small proportion of the entire surface of the cell, the cell surface area is extracted and segmented to obtain the small-sized images to be detected, such that features of these defects are more prominent in the images to be detected, thereby improving the accuracy of defect detection.

According to some embodiments of the present application, the initial image 500 has a first exposure. The extracting the cell surface area 510 from the initial image 500 may include: directly extracting the cell surface area 510 from the initial image 500; and adjusting an exposure of the cell surface area 510 to obtain a cell surface area 510*a* having a second exposure, where the first exposure is higher than the second exposure.

The first exposure may be a high exposure. For example, the image having the first exposure may be obtained in one or more manners of increasing an aperture size of an industrial camera, prolonging an exposure duration of the industrial camera, increasing the brightness in an environment, etc. Since there is generally a blue adhesive tape on the surface of the cell, the cell surface area 510 may be significantly distinguished from other areas (for example, a clamp area 530 and a background area 520) in the image having a higher exposure, that is, the initial image 500 (for example, the cell surface area and the other areas differ significantly in pixel value ranges). However, in the cell surface area 510 having a high exposure, some defects 511 (for example, an indentation defects) are difficult to be distinguished from other parts in the cell surface area 510 (for example, the cell surface area and the other areas differ slightly in pixel value ranges), as shown in FIG. 5. Therefore, the cell surface area 510 having the first exposure is adjusted to the cell surface area 510*a* having the second exposure, so as to make the features of the defect 511 prominent in the cell surface area 510*a*, as shown in FIG. 5.

Therefore, the extraction accuracy of a region of interest (ROI) and the accuracy of subsequent defect detection may be improved.

According to some embodiments of the present application, the first exposure is configured such that a pixel value range of the cell surface area 510 in the initial image 500 is different from a pixel value range of other areas in the initial image 500 than the cell surface area 510.

As shown in FIG. 5, the other areas in the initial image 500 than the cell surface area 510 may include, for example, a clamp area 530 and a background area 520. The exposure of the obtained initial image 500 may be adjusted in at least one of manners of increasing an aperture size of an industrial camera, prolonging an exposure duration of the industrial camera, increasing the brightness in an environment, etc., such that the cell surface area 510 and the other areas 520 and 530 in the initial image 500 greatly differ in pixel value ranges.

The above implementation makes it easy to distinguish the cell surface area 510 from the other areas 520 and 530 in the initial image 500 having the first exposure, thereby facilitating the extraction of the cell surface area 510 from the initial image 500 having the first exposure.

According to some embodiments of the present application, the extracting the cell surface area 510 from the initial image 500 may further include: extracting a cell surface area 510*b* with a preset color channel from the cell surface area 510*a* having the second exposure; and the segmenting the cell surface area 510 to obtain the plurality of images p1 . . . pn to be detected may include segmenting the cell surface area 510*b* with the preset color channel to obtain the plurality of images p1 . . . pn to be detected.

For example, when the initial image 500 is an RGB image, the color channel may be an R channel (red channel), G channel (green channel), or a B channel (blue channel). Because features of some defects 511 (for example, an indentation defect) are more prominent in an image with a specific color channel, the features of these defects may be made prominent in the extracted cell surface area with the preset color channel, as shown by the cell surface area 510*b* with the preset color channel in FIG. 5.

Therefore, this facilitates subsequent detection of the defect detection neural network model on the defect in the cell surface area, so as to further improve the accuracy of defect detection.

According to some embodiments of the present application, the preset color channel is a G channel.

Because there is usually a blue adhesive tape on the surface of the cell, it may be avoided that the blue adhesive tape is extracted together with the cell surface area with the G channel, thereby reducing an impact of the blue adhesive tape on the extraction of features of the defect.

Therefore, this facilitates subsequent detection of the defect detection neural network model on the defect in the cell surface area, so as to further improve the accuracy of defect detection.

According to some embodiments of the present application, the directly extracting the cell surface area 510 from the initial image 500 may include: extracting the cell surface area 510 from the initial image 500 based at least on the pixel value range of the cell surface area.

For example, the initial image 500 may be an RGB image, and is not limited thereto in the present application. The pixel value may be a luminance value of each color channel of a color image. For example, a pixel value of each pixel in an RGB image may include a luminance value, generally ranging from a minimum value of 0 to a maximum value of 255, of each color channel, that is, a red (R) channel, a green (G) channel, or a blue (B) channel. The pixel value range of the cell surface area 510 may be determined according to experience or requirements on battery production process specifications. For example, the pixel value range may be obtained based on a pixel value range for imaging of the surface of the cell under same illumination conditions.

Because the areas in the initial image 500 have specific differences in pixel values, the above technical solution for extracting the cell surface area based on the pixel values of the areas in the initial image may quickly and effectively extract the cell surface area 510.

According to some embodiments of the present application, as shown in FIG. 5, the segmented images p1 . . . pn to be detected have equal sizes.

As described above, the cell surface area is segmented into the plurality of images to be detected having same sizes, so that a requirement on a size of an input image of the defect detection neural network model is met, and the detection of the defect detection neural network model is facilitated.

According to some embodiments of the present application, the inputting the at least one image 512 to be detected into a defect detection neural network model, and obtaining a detection result outputted by the defect detection neural network model in step S403 may include: inputting the at least one image to be detected into the defect detection neural network model, to obtain a defect confidence level of each of the at least one image to be detected; and determining, based on the defect confidence level of each of the at least one image to be detected, whether there is a defect on the surface of the cell.

The defect confidence level may be a probability value, which is used to evaluate a probability of the defect in the image to be detected. FIG. 6 shows detection results t1 . . . tn outputted by a neural network model for corresponding images to be detected of a plurality of images to be detected, where an indentation defect 611 in an image to be detected corresponding to the detection result tn is the most prominent. It can be seen that the defect confidence level (that is, an indentation score) of the detection result tn outputted by the neural network model is the highest, that is, 0.996668, which indicates that the image to be detected corresponding to the detection result tn has the highest probability of having an indentation defect.

The defect detection neural network model may extract more features from the image, thereby improving the efficiency and accuracy of defect detection.

According to some embodiments of the present application, the determining, based on the defect confidence level of each of the at least one image 512 to be detected, whether there is a defect on the surface of the cell includes: determining whether the defect confidence level of each of the at least one image to be detected is less than or equal to a defect threshold; and in response to determining that the defect confidence levels of one or more of the at least one image 512 to be detected are greater than the defect threshold, determining that there is a defect on the surface of the cell.

In other words, if it is determined that the defect confidence level of any one of the at least one image 512 to be detected is greater than the defect threshold, it is determined that there is a defect on the surface of the cell. The defect threshold may be determined according to experience or requirements on battery production process specifications.

As described above, whether there is a defect on the surface of the cell is determined based on the defect confidence level outputted by the defect detection neural network model and the preset defect threshold, so that the efficiency and accuracy of defect detection may be improved.

According to some embodiments of the present application, the method 400 may further include: in response to determining that the defect confidence level of each of the at least one image 512 to be detected is less than or equal to the defect threshold, determining that there is no defect on the surface of the cell and sending an instruction that causes the cell to continue to be transferred to a next process.

According to some embodiments of the present application, the defect 511 is an indentation defect.

The indentation defect is detected by using the method 400, so that the detection efficiency and accuracy of the indentation defect may be improved.

Alternatively, the defect 511 on the surface of the cell may be, for example, a scratch defect, or a bump defect.

Figure 7:
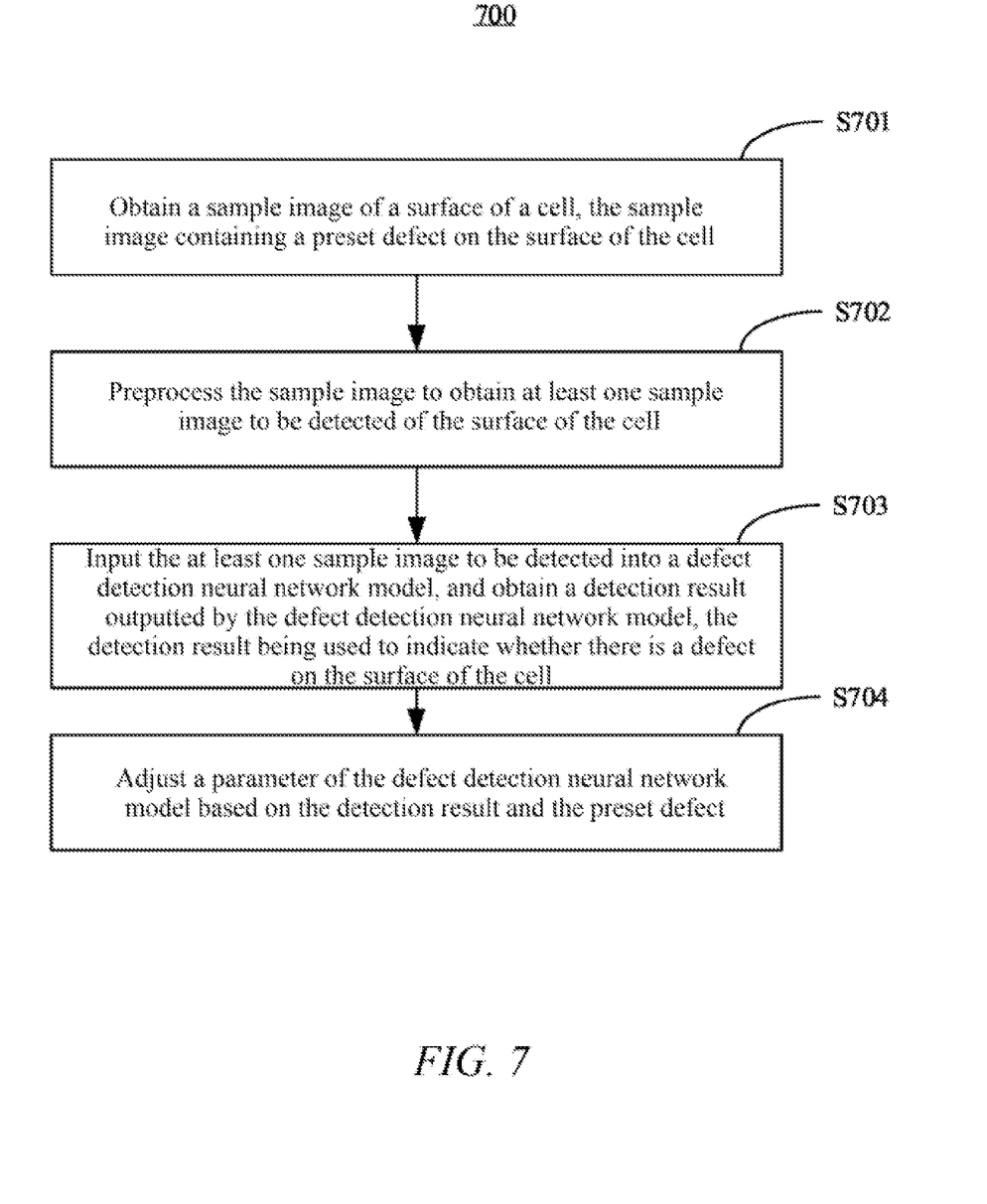
FIG. 7 is a schematic flowchart of a method for training a defect detection neural network model according to some embodiments of the present application.

As shown in FIG. 7, a method 700 for training a defect detection neural network model according to some embodiments of the present application may include the following steps S701 to S704.

In step S701, a sample image of a surface of a cell is obtained, the sample image containing a preset defect on the surface of the cell.

In step S702, the sample image is preprocessed to obtain at least one sample image to be detected of the surface of the cell.

In step S703, the at least one sample image to be detected is inputted into a defect detection neural network model, and a detection result outputted by the defect detection neural network model is obtained, the detection result being used to indicate whether there is a defect on the surface of the cell.

In step S704, a parameter of the defect detection neural network model is adjusted based on the detection result and the preset defect.

The method for obtaining the sample image is the same as that for obtaining the initial image in the method 400, and will not be repeated in detail herein. In addition, features of the preset defect, the sample image to be detected, the defect detection neural network model, and the like are respectively the same as those of the defect, the image to be detected, the defect detection neural network model, and the like in the method 400, and will not be repeated in detail herein.

In some examples, the parameter of the defect detection neural network model is constantly adjusted by using a gradient descent method based on the detection result and the preset defect, such that a loss function of the defect detection neural network model is minimized.

The method 700 may be performed at a server or a client device. The server includes one or more general-purpose computers, a dedicated server computer (e.g., a personal computer (PC) server, a UNIX server, or a terminal server), a blade server, a mainframe computer, a server cluster, or any other suitable arrangement and/or combination. In some implementations, the server may be a server in a distributed system, a server combined with a blockchain, a cloud server, an intelligent cloud computing server or intelligent cloud host with artificial intelligence technologies, etc. The client device may include various types of computer devices, such as a portable handheld device, a general-purpose computer (such as a personal computer and a laptop computer), and a workstation computer.

According to the method 700 in this embodiment of the present application, features of the defect in the image may be made prominent, so as to facilitate subsequent detection of the defect detection neural network model, and the efficiency and accuracy of the defect detection neural network model may also be improved.

According to some embodiments of the present application, the at least one sample image to be detected includes a plurality of sample images to be detected, and the sample image contains a cell surface area where the surface of the cell is located; and the preprocessing the sample image to obtain at least one sample image to be detected of the surface of the cell in step S702 includes: extracting the cell surface area from the sample image; and segmenting the cell surface area to obtain the plurality of sample images to be detected.

The plurality of segmented sample images to be detected may have same sizes or different sizes, or some of the images may have same sizes and the other may have different sizes.

Because some defects on the surface of the cell are relatively small, for example, only account for a small proportion of the entire surface of the cell, the cell surface area is extracted and segmented to obtain the small-sized images to be detected, such that features of these defects are more prominent in the images to be detected, thereby improving the training efficiency and accuracy of the defect detection neural network model.

According to some embodiments of the present application, the sample image has a first exposure, and the extracting the cell surface area from the sample image includes: directly extracting the cell surface area from the sample image; and adjusting an exposure of the cell surface area to obtain a cell surface area having a second exposure, where the first exposure is higher than the second exposure. Features of the first exposure are the same as those of the first exposure in the method 400, and will not be repeated in detail herein. Therefore, the training efficiency and accuracy of the defect detection neural network model may be improved.

According to some embodiments of the present application, the extracting the cell surface area from the sample image further includes: extracting a cell surface area with a preset color channel from the cell surface area having the second exposure; and the segmenting the cell surface area to obtain the plurality of sample images to be detected includes: segmenting the cell surface area with the preset color channel to obtain the plurality of sample images to be detected.

Features of the preset color channel are the same as those of the preset color channel in the method 400, and will not be repeated in detail herein.

Therefore, this facilitates subsequent detection of the defect detection neural network model on the defect in the cell surface area, so as to further improve the training efficiency and accuracy of the defect detection neural network model.

According to some embodiments of the present application, the directly extracting the cell surface area from the sample image may include: extracting the cell surface area from the initial image based at least on the pixel value range of the cell surface area.

Features of the pixel value and the pixel value range are respectively the same as those of the pixel value and the pixel value range in the method 400, and will not be repeated in detail herein.

Figure 8:
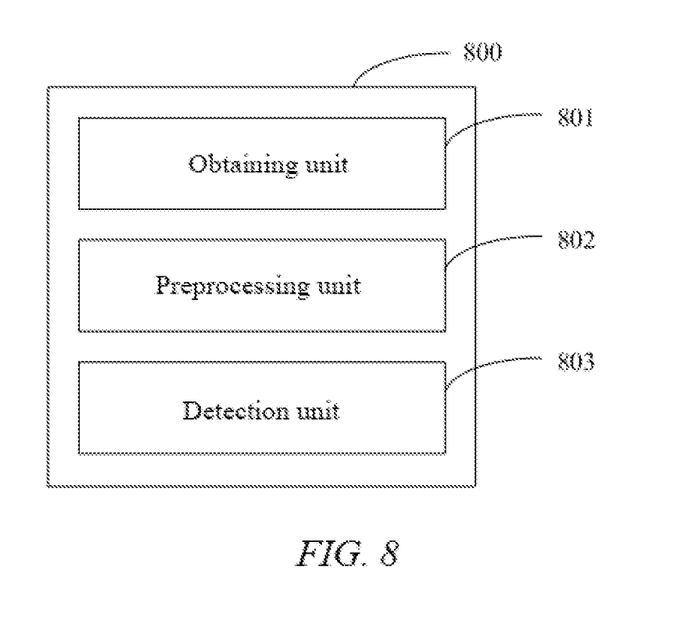
FIG. 8 is a block diagram of a structure for a method for detecting a defect on a surface of a cell according to some embodiments of the present application.

As shown in FIG. 8, an embodiment of the present application further provides an apparatus 800 for detecting an indentation defect on a surface of a cell, including: an obtaining unit 801, a preprocessing unit 802, and a detection unit 803. The obtaining unit 801 is configured to obtain an initial image of the surface of the cell by using an image acquisition unit. The preprocessing unit 802 is configured to preprocess the initial image to obtain at least one image to be detected of the surface of the cell. The detection unit 803 is configured to input the at least one image to be detected into a defect detection neural network model, and obtain a detection result outputted by the defect detection neural network model, the detection result being used to indicate whether there is a defect on the surface of the cell.

It should be understood that each module of the apparatus 800 shown in FIG. 8 may correspond to each step in the method 400 described with reference to FIG. 4. Therefore, the operations, features, and advantages described for the method 400 are also applicable to the apparatus 800 and the modules included therein. For the sake of brevity, some operations, features, and advantages are not repeated herein.

According to the above virtual apparatus in this embodiment of the present application, features of the defect in the image may be made prominent, so as to facilitate subsequent detection of the defect detection neural network model; and more features may be extracted from the image, thereby improving the efficiency and accuracy of defect detection.

Figure 9:
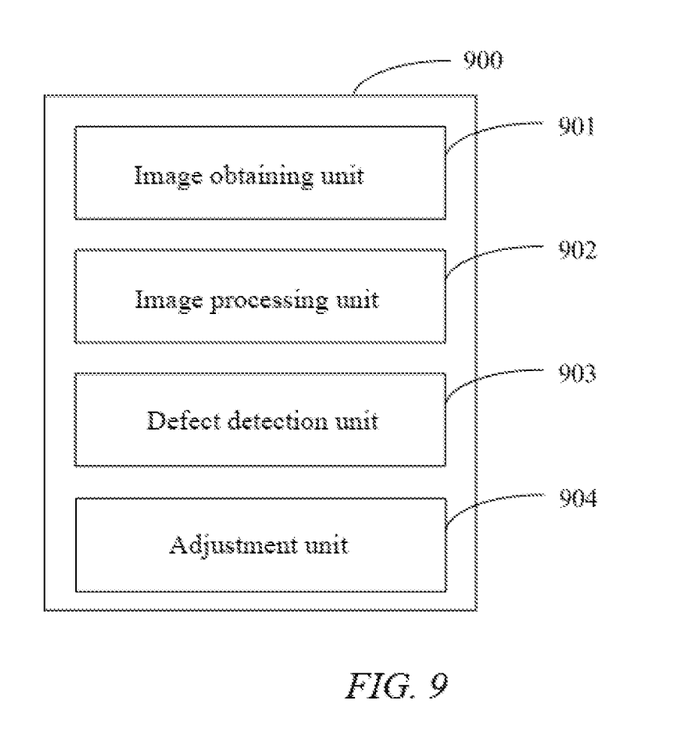
FIG. 9 is a block diagram of a structure for a method for training a defect detection neural network model according to some embodiments of the present application.

As shown in FIG. 9, an embodiment of the present application further provides an apparatus 900 for training a defect detection neural network model, including: an image obtaining unit 901, an image processing unit 902, a defect detection unit 903, and an adjustment unit 904. The image obtaining unit 901 is configured to obtain a sample image of a surface of a cell, the sample image containing a preset defect on the surface of the cell. The preprocessing module 902 is configured to preprocess the sample image to obtain at least one sample image to be detected of the surface of the cell. The defect detection unit 903 is configured to input the at least one sample image to be detected into the defect detection neural network model, and obtain a detection result outputted by the defect detection neural network model, the detection result being used to indicate whether there is a defect on the surface of the cell. The adjustment unit 904 is configured to adjust a parameter of the defect detection neural network model based on the detection result and the preset defect.

It should be understood that each module of the apparatus 900 shown in FIG. 9 may correspond to each step in the method 700 described with reference to FIG. 8. Therefore, the operations, features, and advantages described for the method 700 are also applicable to the apparatus 900 and the modules included therein. For the sake of brevity, some operations, features, and advantages are not repeated herein.

According to the above virtual apparatus in this embodiment of the present application, features of the defect in the image may be made prominent, so as to facilitate subsequent detection of the defect detection neural network model, and the efficiency and accuracy of the defect detection neural network model may also be improved.

An embodiment of the present application further provides an electronic device, including: at least one processor and a memory communicatively connected to the at least one processor, where the memory stores instructions executable by the at least one processor, and the instructions, when executed by the at least one processor, cause the at least one processor to perform the method 400 and/or the method 700.

An embodiment of the present application further provides a computer-readable storage medium storing computer instructions, where the computer instructions are used to cause a computer to perform the method 400 and/or the method 700.

An embodiment of the present application further provides a computer program product, including a computer program, where the computer program, when executed by a processor, implements the method 400 and/or the method 700.

Figure 10:
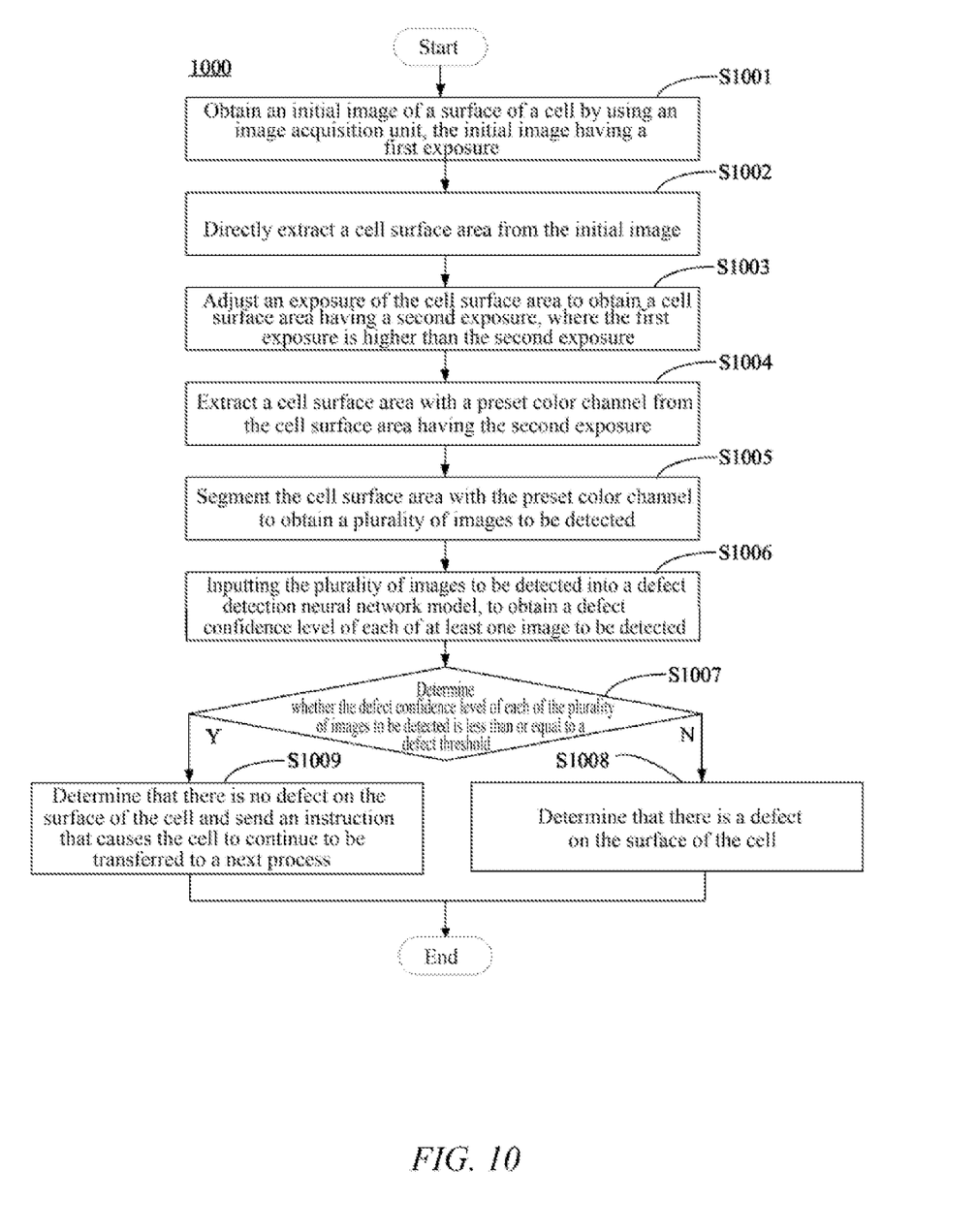
FIG. 10 is a schematic flowchart of a method for detecting a defect on a surface of a cell according to some other embodiments of the present application.

As shown in FIG. 10, a method 1000 for detecting a defect on a surface of a cell according to some embodiments of the present application includes the following steps S1001 to S1011.

In step S1001, an initial image of the surface of the cell is obtained by using an image acquisition unit, the initial image having a first exposure.

In step S1002, a cell surface area is directly extracted from the initial image.

In step S1003, an exposure of the cell surface area is adjusted to obtain a cell surface area having a second exposure, where the first exposure is higher than the second exposure.

In step S1004, a cell surface area with a preset color channel is extracted from the cell surface area having the second exposure.

In step S1005, the cell surface area with the preset color channel is segmented to obtain a plurality of images to be detected.

In step S1006, the plurality of images to be detected are inputted into a defect detection neural network model, to obtain a defect confidence level of each of at least one image to be detected.

In step S1007, whether the defect confidence level of each of the plurality of images to be detected is less than or equal to a defect threshold is determined.

In step S1008, in response to determining that the defect confidence level of any one of the plurality of images to be detected is greater than the defect threshold, it is determined that there is a defect on the surface of the cell.

In step S1009, in response to determining that the defect confidence levels all of the plurality of images to be detected are less than or equal to the defect threshold, it is determined that there is no defect on the surface of the cell and an instruction that causes the cell to continue to be transferred to a next process is sent.

Each step in the method 1000 has the same features as the corresponding step in the method 400. For the sake of brevity, this will not be repeated herein.

According to the method 1000 in this embodiment of the present application, features of the defect in the image may be made prominent, so as to facilitate subsequent detection of the defect detection neural network model; and more features may be extracted from the image, thereby helping recognizing the defect more efficiently, so as to improve the efficiency and accuracy of defect detection.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A computer implemented method for detecting a defect on a surface of a battery cell, comprising: obtaining an initial image of the surface of the cell by using an image acquisition unit; preprocessing the initial image to obtain at least one image to be detected of the surface of the cell; and inputting the at least one image to be detected into a defect detection neural network model, and obtaining a detection result outputted by the defect detection neural network model, the detection result being used to indicate whether there is a defect on the surface of the cell;

wherein the at least one image to be detected comprises a plurality of images to be detected, and the initial image contains a cell surface area where the surface of the cell is located; and the preprocessing the initial image to obtain at least one image to be detected of the surface of the cell comprises: extracting the cell surface area from the initial image; and segmenting the cell surface area to obtain the plurality of images to be detected;

wherein the initial image has a first exposure; and the extracting the cell surface area from the initial image comprises: directly extracting the cell surface area from the initial image; and adjusting an exposure of the cell surface area to obtain a cell surface area having a second exposure, wherein the first exposure is higher than the second exposure;

wherein the first exposure is configured such that a pixel value range of the cell surface area in the initial image is different from a pixel value range of other areas in the initial image than the cell surface area;

wherein the extracting the cell surface area from the initial image further comprises: extracting a cell surface area with a preset color channel from the cell surface area having the second exposure; and the segmenting the cell surface area to obtain the plurality of images to be detected comprises: segmenting the cell surface area with the preset color channel to obtain the plurality of images to be detected.

2. The method according to claim 1, wherein the preset color channel is a G channel.

3. The method according to claim 1, wherein the directly extracting the cell surface area from the initial image comprises: extracting the cell surface area from the initial image based at least on the pixel value range of the cell surface area.

4. The method according to claim 1, wherein the plurality of images to be detected have equal sizes.

5. The method according to claim 1, wherein the detection result comprises a corresponding defect confidence level of each of the images to be detected, and the inputting the at least one image to be detected into a defect detection neural network model, and obtaining a detection result outputted by the defect detection neural network model comprises: inputting the at least one image to be detected into the defect detection neural network model, to obtain a defect confidence level of each of the at least one image to be detected; and determining, based on the defect confidence level of each of the at least one image to be detected, whether there is a defect on the surface of the cell.

6. The method according to claim 5, wherein the determining, based on the defect confidence level of each of the at least one image to be detected, whether there is a defect on the surface of the cell comprises: determining whether the defect confidence level of each of the at least one image to be detected is less than or equal to a defect threshold; and in response to determining that the defect confidence levels of one or more of the at least one image to be detected are greater than the defect threshold, determining that there is a defect on the surface of the cell.

7. The method according to claim 1, wherein the defect is an indentation defect.

8. A method for training a defect detection neural network model, comprising: obtaining a sample image of a surface of a battery cell, the sample image containing a preset defect on the surface of the cell; preprocessing the sample image to obtain at least one sample image to be detected of the surface of the cell; inputting the at least one sample image to be detected into the defect detection neural network model, and obtaining a detection result outputted by the defect detection neural network model, the detection result being used to indicate whether there is a defect on the surface of the cell; and adjusting a parameter of the defect detection neural network model based on the detection result and the preset defect;

wherein the at least one sample image to be detected comprises a plurality of sample images to be detected, and the sample image contains a cell surface area where the surface of the cell is located; and the preprocessing the sample image to obtain at least one sample image to be detected of the surface of the cell comprises: extracting the cell surface area from the sample image; and segmenting the cell surface area to obtain the plurality of sample images to be detected;

wherein the sample image has a first exposure; and the extracting the cell surface area from the sample image comprises: directly extracting the cell surface area from the sample image; and adjusting an exposure of the cell surface area to obtain a cell surface area having a second exposure, wherein the first exposure is higher than the second exposure; and wherein the extracting the cell surface area from the sample image further comprises: extracting a cell surface area with a preset color channel from the cell surface area having the second exposure; and the segmenting the cell surface area to obtain the plurality of sample images to be detected comprises: segmenting the cell surface area with the preset color channel to obtain the plurality of sample images to be detected.

9. An apparatus for detecting an indentation defect on a surface of a cell by carrying out the method according to claim 1, the apparatus, comprising: a camera configured to obtain an initial image of the surface of the cell a processor configured to preprocess the initial image to obtain at least one image to be detected of the surface of the cell; and a detection neural network model detection unit configured to receive in input the at least one image to be detected, and output a detection result, the detection result being used to indicate whether there is a defect on the surface of the cell.

10. An apparatus for training a defect detection neural network model by carrying out the method of claim 8, comprising: a camera configured to obtain a sample image of a surface of a cell, the sample image containing a preset defect on the surface of the cell; a processor configured to preprocess the sample image to obtain at least one sample image to be detected of the surface of the cell; a defect detection neural network model configured to input the at least one sample image to be detected, and obtain output a detection result, the detection result being used to indicate whether there is a defect on the surface of the cell; the processor being further configured to adjust a parameter of the defect detection neural network model based on the detection result and the preset defect.

11. An electronic device, comprising at least one processor and a memory communicatively connected to the at least one processor, wherein the memory stores instructions executable by the at least one processor, and the instructions, when executed by the at least one processor, cause the at least one processor to perform a method according to claim 1.

12. A non-transitory computer-readable storage medium storing computer instructions, wherein the computer instructions are used to cause a computer to perform a method according to claim 1.

13. A computer program product, comprising a computer program stored in a non-transitory computer-readable storage medium, wherein the computer program, when executed by a processor, implements a method according to claim 1.

14. An electronic device, comprising at least one processor and a memory communicatively connected to the at least one processor, wherein the memory stores instructions executable by the at least one processor, and the instructions, when executed by the at least one processor, cause the at least one processor to perform a method according to claim 8.

15. A non-transitory computer-readable storage medium storing computer instructions, wherein the computer instructions are used to cause a computer to perform a method according to claim 8.

16. A computer program product, comprising a computer program stored in a non-transitory computer-readable storage medium, wherein the computer program, when executed by a processor, implements a method according to claim 8.

* * * * *